March 5, 1968   D. E. STUHLMILLER   3,371,758
MAGNETICALLY OPERATED FRICTION CLUTCH
Filed March 24, 1966

INVENTOR.
DON E. STUHLMILLER
BY
*Christel + Bean*
ATTORNEYS

United States Patent Office 3,371,758
Patented Mar. 5, 1968

3,371,758
MAGNETICALLY OPERATED FRICTION CLUTCH
Don E. Stuhlmiller, Kenmore, N.Y., assignor to General-Electro Mechanical Corporation, Buffalo, N.Y.
Filed Mar. 24, 1966, Ser. No. 537,038
2 Claims. (Cl. 192—84)

ABSTRACT OF THE DISCLOSURE

A magnetic clutch having a hollow cylindrical casing with an annular wall at one end thereof defining a recess for a magnetic winding. A rotatably driven member of magnetic material passes through the annular wall and together with the casing forms a U-shaped flux path for the winding. A driven member has a flat radial face in close juxtaposition to the end of the casing opposite to the annular wall and to adjacent end of the driving member, and the adjacent end of the driving member has an outward annular flange carrying friction material for clutching engagement with the face of the driven member when the latter is attracted electromagnetically.

---

Figure 1:
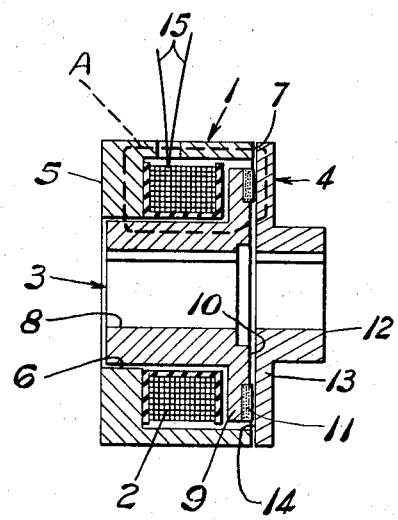

This invention relates to electromagnetically actuated clutches and more particularly to an electromagnetically actuated friction clutch of simplified construction providing a flux path resulting in efficient flux travel, the clutch being of a type wherein an electromagnet attracts a rotatable member into frictional driving engagement with a companion rotatable member.

In some electromagnetically actuated clutches of known types, the windings comprise a portion of either the driving or driven member and rotate therewith, necessitating such structurre as brushes, slip rings or the like for excitation of the windings which cooperate with magnetic material to produce flux forces for controlling the clutching action. Such structure not only adds to the weight and bulk of the clutch but requires some maintenance in cleaning the brushes, slip rings, etc. to insure proper contact. Furthermore, the rotatability of the magnetic winding adds substantially to the rotating mass incident to clutching and driving operation.

In cases where windings are disposed in fixed casings, difficulties arise in producing a flux path which efficiently conducts flux to produce the clutching action. Non-magnetic insulating materials are often required and variously positioned within the clutch structure to direct the flux along such predetermined path. These added materials increase the cost of construction and reduce the efficiency of the clutch by providing slower acting coupling and inability to transmit higher torque loads in addition to requiring a clutch of greater weight and bulk for a given capacity.

Accordingly, it is a primary object of the present invention to provide a simplified electromagnetically actuated clutch construction having relatively few parts including a stationary casing, a driving member and a driven member, all arranged to provide a predetermined highly efficient flux path for conducting flux through a major portion of each part and between such parts in a manner providing efficient and highly effective clutching action.

It is another object of the present invention to provide an electromagnetically actuated clutch of the foregoing characteristics wherein such parts are arranged in a manner providing a very low reluctance flux path with minimum flux leakage. The spacing between the fixed casing and rotatable driven member across which the flux passes is a working clearance only and the spacing between the clutch faces of the driving member and driven member and between the driven member and the casing are minimal, likewise to reduce flux path reluctance and flux leakage.

It is a further object of the present invention to provide an electromagnetically actuated clutch of the foregoing characteristics wherein magnetic insulating materials such as brass insert rings and the like are not required to direct the flux along the predetermined desired flux path, thereby providing a more compact and lighter weight clutch.

Various other novel features of construction and advantages inherent in the electromagnetically actuated friction clutch construction of the present invention are pointed out in detail in conjunction with the following description of a typical embodiment of the invention. It is to be understood that the detailed embodiment illustrated in the accompanying drawing and described in the following specification is by way of example only and to illustrate the principles of the present invention, the scope of which is limited only as defined in the appended claims.

Figure 2:
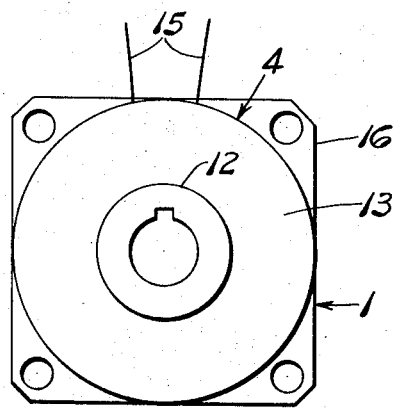

In the drawing:

FIG. 1 is an axial cross sectional view of one form of an electromagnetically actuated friction clutch constructed in accordance with the present invention; and FIG. 2 is an end view thereof.

Referring now to the drawing, there is shown an embodiment of the invention comprising generally an annular casing 1 housing an electromagnetic winding 2 and a driving member designated generally 3. A driven member designated generally 4 is adapted to be drawn axially into frictional engagement with driving member 3 upon energization of winding 2 which establishes a flux path through the parts in a manner which presently appears.

Annular casing 1 is formed of magnetic material and has an annular end wall portion 5 with a bore 6 extending axially therethrough. The outer end of casing 1 is open and terminates in a flat radial rim 7.

Driving member 3, also formed of magnetic material, is disposed axially within casing 1 and comprises a cylindrical bearing portion 8 having one end extending through bore 6 in radially spaced relation but in close proximity to end wall portion 5 of the casing. In the form shown herein by way of example driving member 3 is rotatably supported within casing 1 by independent means, not shown, although casing 1 may furnish such support providing the flux passing therebetween, as will appear presently, remains substantially unimpeded.

Bearing portion 8 has a radially outwardly projecting annular flange 9 at its other end, the outer face 10 thereof being disposed approximately in a transverse plane passing through rim 7 at the end of casing 1. The periphery of flange 9 is spaced radially inwardly from the interior of casing 1 adjacent rim 7 a distance sufficient to provide a substantial air gap for reasons hereinafter described. Suitable frictional material 11 is secured to the outer face 10 of flange 9 adjacent the peripheral portion thereof and projects slightly axially from face 10 for engaging the adjacent radial surface of driven member 4.

Driven member 4 is also formed of magnetic material and comprises a hub 12 having a radial annular flange 13 at one end, the diameter of the flange being approximately the same as the diameter of casing 1. Flange 13 has an end face 14 disposed in close juxtaposition to face 10 of driving member 4 and rim 7 of casing 1. Member 4 is mounted for rotation and relative axial movement by conventional means, not shown, and is coaxial with driving member 3.

Annular casing 1 together with inwardly extending portion 5 form with driving member 4 an annular cavity. Winding 2 is secured to casing 1 within this cavity and conductors 15 are provided for energizing winding 9 to produce magnetic flux which flows through the magnetic material of the fixed casing and the rotatable driving and driven members along a predetermined path indicated by the heavy dash line A of FIG. 1.

The proportions, relative disposition and spacing of the fixed and moving parts of the present construction are significant in the establishment of the desired flux path through the parts. The radial spacing between end wall portion 5 and the end of bearing portion 8 extending through bore 6 is a working clearance providing a minimum reluctance flux path between driving member 3 and casing 1 at this point. Likewise, the longitudinal spacing between face 14 of driven member 4 and face 10 of driving member 3 and similarly the longitudinal spacing between face 14 and rim 7 of casing 1 are minimal, providing a minimum reluctance flux path therebetween.

Prior to excitation of winding 2, the spacing between friction material 11 and face 14 is a working clearance. However, the radial air gap between the interior of casing 1 and the periphery of flange 9 of driving member 3 is sufficient to effectively preclude the passing of flux thereacross. This establishes a very direct and effective flux path as indicated by the dash line A in FIG. 1.

It is to be understood that the driving and driven members may be reversed if desired. As shown in FIG. 2, lugs 16 are provided on casing 1 for securing the same to a fixed structure.

It will be seen from the foregoing that I have provided a structurally simplified electromagnetically actuated friction clutch comprising only five basic parts wherein the clutching members are arranged to provide a flux path with minimum reluctance, thereby affording an extremely efficient flux circuit having minimum losses. Moreover, it will be noted that the usual insulating materials customarily required to direct the flux in a proper path are dispensed with, thus further simplifying the structure without loss of efficiency.

I claim:

1. An electromagnetically actuated clutch comprising an annular casing of magnetic material having a radially inwardly extending annular portion at one end thereof, a rotatable member of magnetic material having one end extending through and in close proximity to said annular portion together with a clutch face at its other end disposed slightly beyond the transverse plane of the other end of said casing, said rotatable member forming with said casing and said inwardly extending annular portion an annular cavity, a winding within said cavity fixed to said casing, and a second rotatable member axially alined with said first rotatable member, said second member being axially movable and having a face of magnetic material in close juxtaposition with said other end of said casing and said other end of said first rotatable member whereby energization of said winding causes said second rotatable member to move axially into driving engagement with the clutch face of said first rotatable member, said annular casing and the inwardly extending annular portion thereof cooperating with said first rotatable member to form a U-shaped flux path terminating at both ends substantially directly at the face of said second rotatable member, said other end of said first rotatable member having a radially projecting flange with the periphery thereof radially spaced from said casing, and wherein said clutch face is disposed on said flange radially between said ends of said U-shaped flux path.

2. A clutch according to claim 1 wherein said clutch face on said first member comprises a facing of frictional material for frictionally engaging said face of said second member.

References Cited
UNITED STATES PATENTS

| | | | |
|---|---|---|---|
| 3,310,141 | 3/1967 | Smirl | 192—84 |
| 2,618,368 | 11/1952 | Hoover | 192—84 |
| 2,492,205 | 12/1949 | Warner | 192—84 |

CARLTON R. CROYLE, *Primary Examiner.*

MARK NEWMAN, *Examiner.*

C. M. LEEDOM, *Assistant Examiner.*